United States Patent [19]

Lee

[11] Patent Number: 5,075,530
[45] Date of Patent: Dec. 24, 1991

[54] MULTI-HEAD TYPE OF ELECTRO-DISCHARGING MACHINE

[76] Inventor: Shih-Lu Lee, 2FL, No. 128, Wan An Street, Hsing Chuan City, Taipei, Taiwan

[21] Appl. No.: 555,846

[22] Filed: Jul. 23, 1990

[51] Int. Cl.$^5$ .......................... B23H 1/00; B23Q 5/34
[52] U.S. Cl. .................................... 219/69.11; 29/50; 219/69.15; 408/42
[58] Field of Search .................. 219/69.1, 69.11, 69.15, 219/69.12, 69.2; 29/568, 50, 52, 53, 51, 54–56, 565; 408/31, 42, 53, 237; 204/224 M, 297 R

[56] References Cited

U.S. PATENT DOCUMENTS

| | | | |
|---|---|---|---|
| 4,233,485 | 11/1980 | Sato et al. | 219/69.2 |
| 4,670,635 | 6/1987 | Johnson et al. | 219/69.15 |
| 4,730,373 | 3/1988 | Senoh | 29/565 |
| 4,749,838 | 6/1988 | Lodetti et al. | 204/224 M |
| 4,814,573 | 3/1989 | Check et al. | 29/568 |
| 4,945,958 | 8/1990 | Shoda | 408/31 |

FOREIGN PATENT DOCUMENTS 64-16320  1/1989  Japan ................................. 219/69.11

OTHER PUBLICATIONS

"Development of Continuous Path Controlled EDM Machine Tools by Means of Design Systematics" by Karl Schekulin, *EDM DIGEST*, Apr. 1986, pp. 8–13.

*Primary Examiner*—Geoffrey S. Evans
*Attorney, Agent, or Firm*—Esso International Patent and Trademark Office

[57] ABSTRACT

A multi-head electro-discharging machine, in which each head member has an independent transmission assembly; the head member can move in X-axis, Y-axis and Z-axis directions by a guide screw rod; every head member can be adjusted independently for operation without intervening the others; every head member may be mounted with an electrode connector, and two head members can be operated simultaneously in a crossing manner; a plurality of head members are mounted along the rear side of a supporting frame of the machine, and one or more than one head members may be mounted on both ends of the supporting frame for further multi-processing operation.

2 Claims, 8 Drawing Sheets

FIG_7

MULTI-HEAD TYPE OF ELECTRO-DISCHARGING MACHINE

BACKGROUND OF THE INVENTION

Generally, a conventional electro-discharging machine is considered a very slow processing machine; especially, when a working piece has to be processed in several portions, it would take a considerable time to complete the work; occasionally, the delivery time of a product would be delayed. The conventional electro-discharging machine can only process one portion of a work piece at a time; after that portion is completed, the next portion of the work piece will be processed; as a result, time and manpower would be wasted.

Further, the major structure of a conventional electro-discharging machine comprises a movable x-axis and a Y-axis, working racks, and a fixed Z-axis discharging head member; in other words, the machine has only one head member, and therefore the machine requires an excessive period of time to complete a machine operation. Since the working rack can be moved by means of a manual X-axis guide screw rod and a Y-axis guide screw rod, the operation person has difficulty in operating the guide screw rods in the event of a heavy working piece being processed. Also, heavy work pieces can sometimes cause the guide screw rods and the working rack to possibly be deformed; in that case, the precision of the working rack will be jeopardized.

The current patented two-head type of discharging machine is still not deemed a perfect machine because of the drawbacks described as follows:

(1) A discharging machine in U.S. Pat. No. 4,739,145 disclosed by Check et al (145) has a head member to be driven for adjustment with a cylinder along a slide rail. Since the movement range of a mount driven by the cylinder is limited, each head member can only move over one half of the working rack. If the processing portion of a working piece is located within one side of the working rack, the head member which is away from that portion will be unable to move into the area, i.e., the processing space is limited.

(2) In a Japanese Patent JAU 46-16320, the two-head type of electro-discharging machine has a fixed Y-axis to be slid along a sliding rail, being mounted over a processing channel. In case of a large working piece to be processed thereon, it would be rather difficult to place the working piece on the machine; since the movement range of the head members is limited, the processing efficiency would be limited in situations where the surface to be machined is beyond the area that the head member can reach.

(3) In a U.S. Pat. No. 4,670,635 disclosed by Johnson et al, the head member of the machine can be replaced by means of a support arm and a turret. The head member can only be turned at a given angle for Z-axis movement; for movement in other directions, the working rack is the only part that can be moved.

SUMMARY OF THE INVENTION

This invention relates to a multi-head type of electro-discharging machine, and particularly to a machine, of which each head member can be operated independently without being interfered by other head member. The machine mainly comprises a plurality of independent head members, which can be operated simultaneously by means of a plurality of X-axis, Y-axis and Z-axis guide screw rods, and a fixed working rack so as to bear a heavy working piece without affecting the precision of processing. Each head member can be moved along an X-axis, Y-axis, and Z-axis by means of guide screw rods respectively so as to let all or several head members work simultaneously.

Another feature of the present invention is to provide an electro-discharging machine, in which an extension assembly is mounted for adding an electrode connector so as to increase the processing range beyond which a regular head member could normally reach; further, the two head member with their extension assemblies can also be operated in a cross manner at the same time so as to eliminate a dead-angle in terms of processing space for incresing the processing efficiency.

BRIEF DESCRIPTION OF THE DRAWINGS:

FIG. 3-1 illustrates an operating feature according to the present invention.

FIG. 3-2 illustrates an another operating feature according to the present invention.

DETAILED DESCRIPTION

Figure 1:
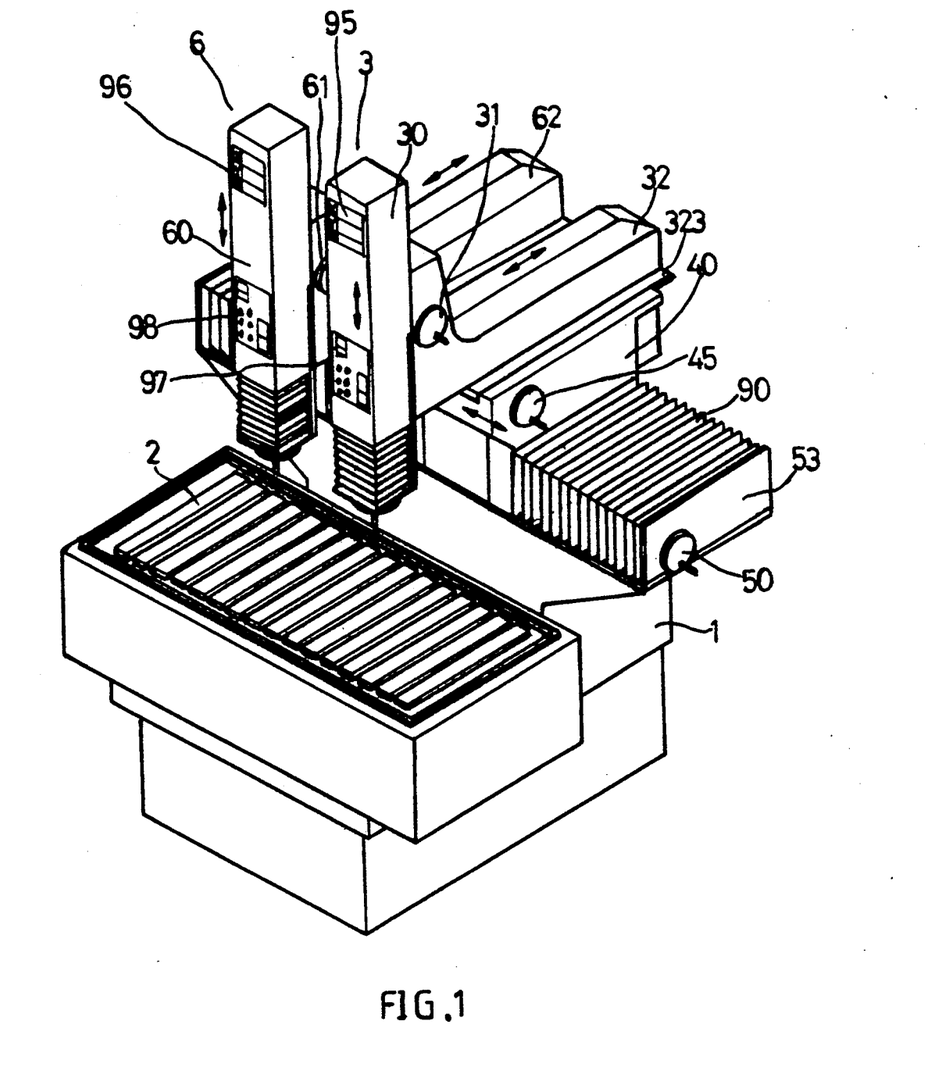
FIG. 1 is a perspective view of an embodiment according to the present invention.

Referring to FIG. 1, the present invention mainly comprises a supporting frame 1, a working rack 2, two head members 3 and 6, and some control and transmission parts. The working rack 2 is fixedly attached to the supporting frame 1 for supporting a heavy working piece for operation convenience and precision.

Figure 2:
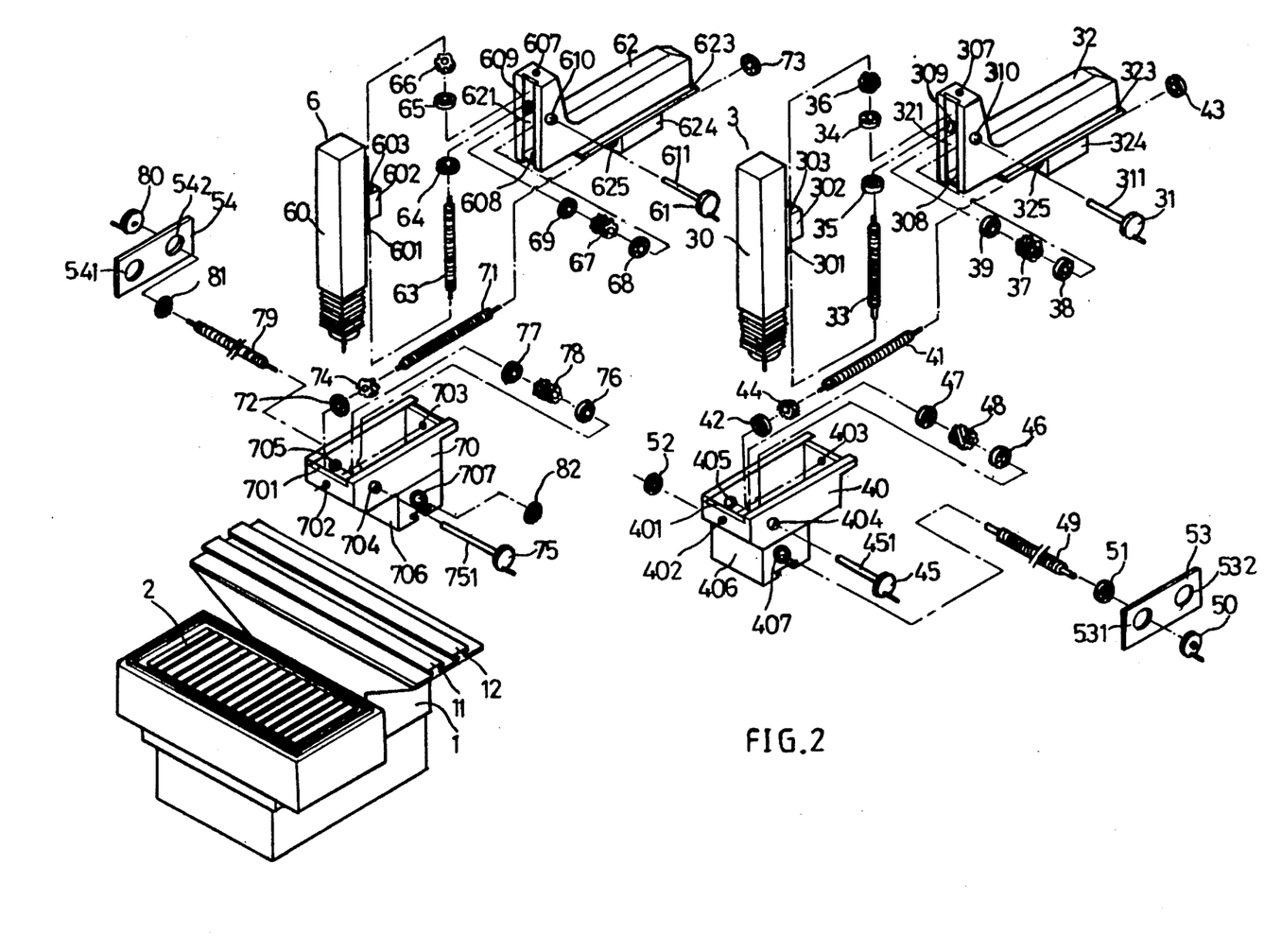
FIG. 2 is a disassembled view of the FIG. 1 embodiment of the present invention.

FIG. 2 illustrates a disassembled view of an embodiment of the present invention, in which an outer frame 30 of the head member 3 is coupled with a sliding block 32; a control handle 31 (Z-axis control handle) is mounted at one side of the sliding block 32 so as to control the head member 3 to move up and down along the Z-axis. The front side of sliding block 32 has a dovetail-shaped sliding channel 321 to be mated with a sliding guide member 301 so as to have the outer frame 30 move up and down freely. The outer frame 30 has a salient block 302 with a screw hole 303 for receiving a guide screw rod 33, of which both ends are mounted with two bearings 34 and 35 respectively so as to facilitate the guide screw rod 33 to be mounted in the holes 307 and 308 respectively. The upper end of the guide screw rod 33 is mounted with a worm wheel 36, which is engaged with a worm 37 on a transmission rod 311 of a control handle 31. The transmission rod 311 is mounted in two holes 309 and 310 by means of two bearings 38 and 39 respectively. The transmission rod 311 of the control handle 31 is coupled with the worm 37, which is further coupled with a worm wheel 36 on the guide screw rod 33. The function of the worm wheel 36 and the worm 37 are used to transmit the rotation force of the control handle 31 to the guide screw rod 33, whereby the head member 3 is to move along Z-axis. The bottom of the sliding block 32 is mounted with a guide member 323 and a salient block 324. The guide member 323 is fitted in a sliding channel 401 on the base 40 to move back and forth freely. The base is also mounted with a guide screw rod 41 by means of two bearings 42 and 43 installed in two holes 402 and 403 respectively. The front end of the guide screw rod 41 is mounted with a worm wheel 44; one side of the base 40 is also mounted with a control handle 45 by means of two bearings 46 and 47 to be fitted in two holes 404 and 405 respectively. The transmission rod 451 of the control handle 45 is mounted with a worm 48, which is to be engaged with a worm wheel 44 on the guide screw rod 41 so as to have the rotation force of the control handle 45 coupled to the guide screw rod 41 for operating and adjusting the head member 3 on the base 40 to move along Y-axis.

The bottom of the base 40 is mounted with a salient block 406 with a screw hole 407 for mounting a guide screw rod 49 so as to have the block 406 slide back and forth by means of a control handle 50 along the sliding rail 11 on the supporting frame 1. The guide screw rod 49 is mounted on the fixed plates 53 and 54 by means of two bearings 51 and 52; the plates 53 and 54 are welded to opposite ends of the supporting frame 1 respectively (as shown in FIG. 1) so as to cover the end of each bellows 90.

Beside the head member 3, another head member 6 is installed (since the structure thereof is the same as that of the head member 3, the description thereof is omitted) so as to have the electro-discharging machine furnished with two head members 3 and 6. The base 70 of the head member 6 is mounted on a sliding rail 12 of the supporting frame 1. The head member 6 is also provided with a Z-axis control handle 61, a Y-axis control handle 75, and an X-axis control handle 80 so as to facilitate the head member 6 to operate independently.

Figure 31:
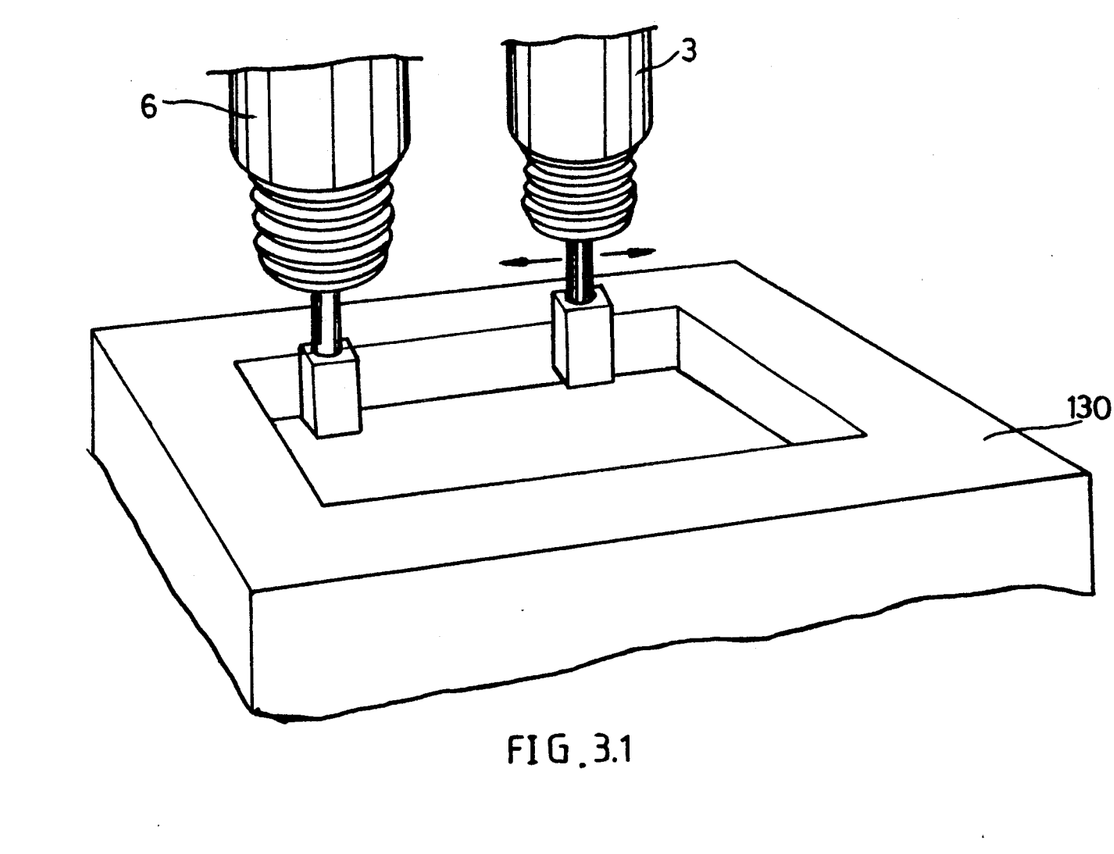

According to the present invention, the two head members 3 and 6 can manually be adjusted and operated by means of the guide screw rods and the control handles thereof so as to reduce the working time about ½ or less than that of the conventional electro-discharging machine (in case of a working piece to be processed on several different parts); in other words, the multi-head type of electro-discharging machine can display its working efficiency by reducing the working time on a working piece. FIG. 3-1 illustrates an embodiment according to the present invention, in which if the head member 3 has finished its process on a working piece, it can be moved into another working area to work on another working piece, while the head member 6 is still working on its original position with one working piece, i.e., the two head members can be set to two different working pieces separately without being interferring with each other.

Figure 4:
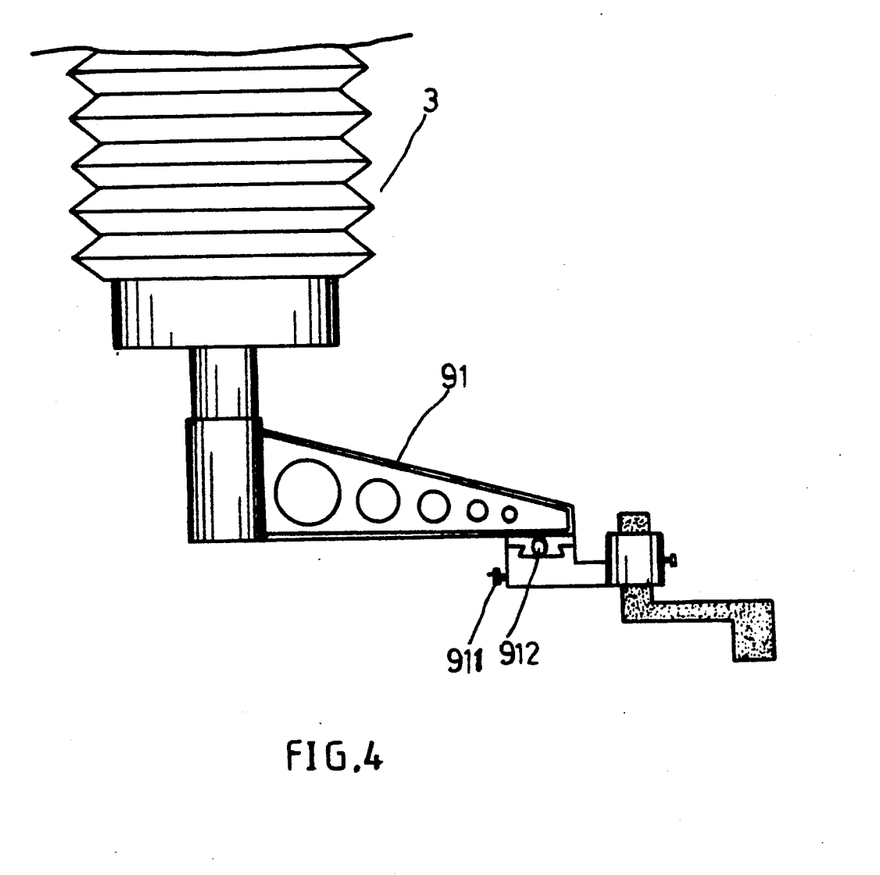
FIG. 4 illustrates an extension assembly adapted for use on the FIG. 1 embodiment of the present invention.
Figure 5:
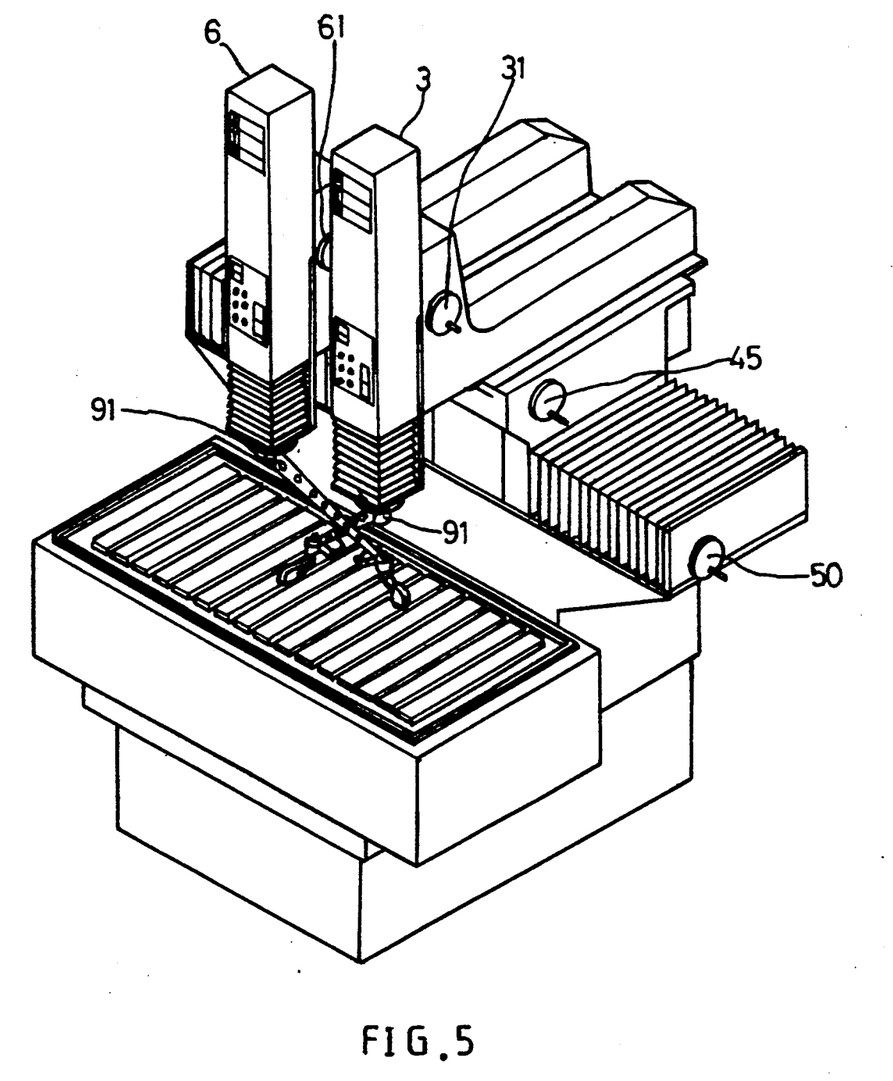
FIG. 5 illustrates the FIG. 1 apparatus equipped with the extension assembly shown in FIG. 4.

FIG. 4 illustrates an extension assembly being connected with the major parts of the present invention, in which the head member 3 or 6 is mounted with an electrode connector 91 so as to let the head member reach a working piece beyond the normal range; for example, the two head members 3 and 6 may be operated in an overlapped manner as shown in FIG. 5. The front end of the electrode connector 91 may be mounted with X-axis and Y-axis adjusting members 911 and 912 so as to provide a more precise operation if necessary.

Figure 6:
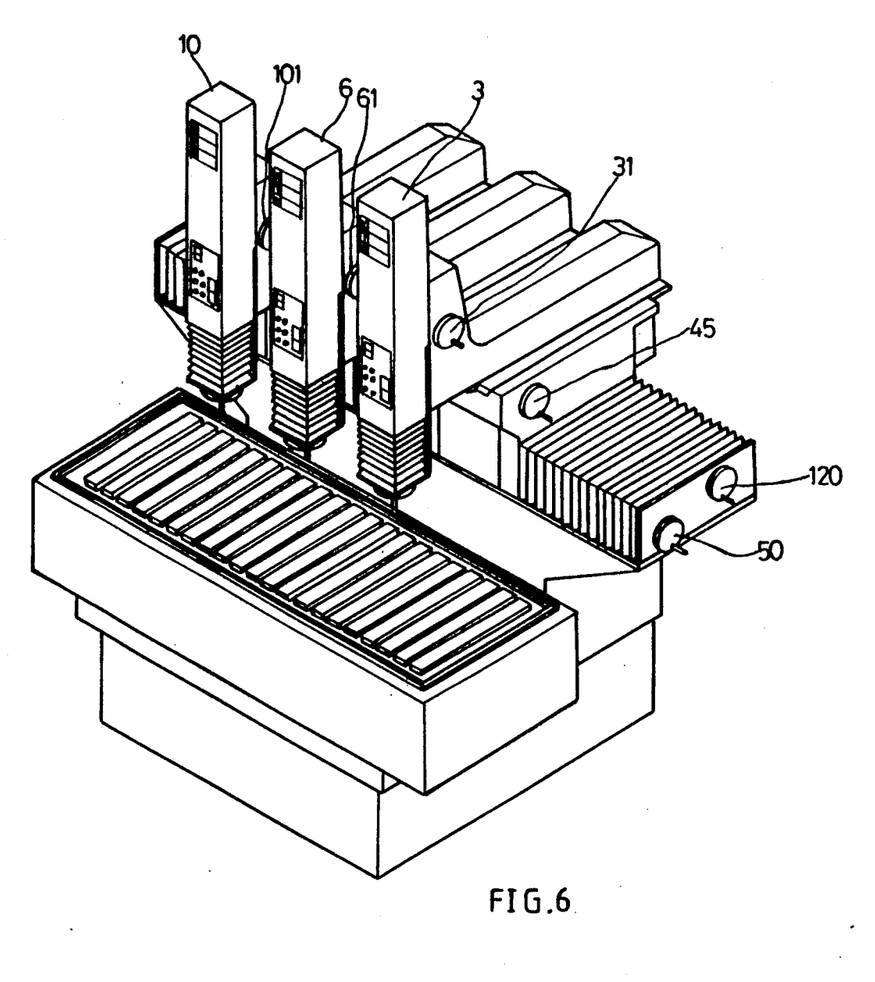
FIG. 6 is a perspective view of an another embodiment of the present invention.
Figure 32:
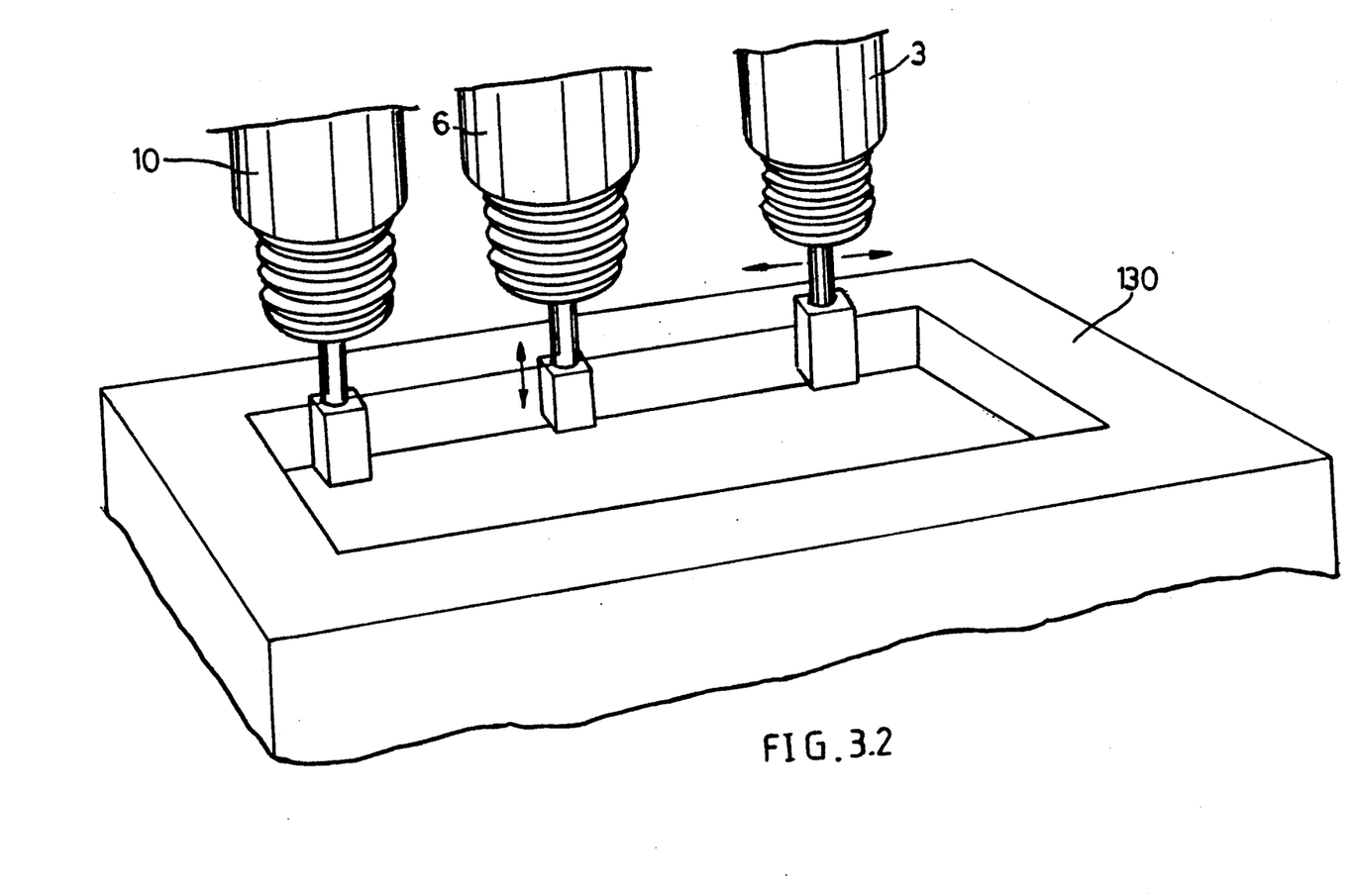

FIG. 6 illustrates another embodiment according to the present invention, in which three head members (four or five head members, if necessary) are installed, i.e., a head member 10 is added to the machine as shown in FIG. 1; the three head members are installed in parallel for simultaneous operation or independent operation. FIG. 3-2 illustrates an embodiment of the present invention having three head members 3, 6 and 10, of which each can be operated independently.

According to the present invention, the head member is driven with a guide screw rod, and the operation thereof can be made manually through a control handle. The machine may also be operated electrically and automatically with a circuit control box 97 as shown in FIG. 1.

Figure 7:
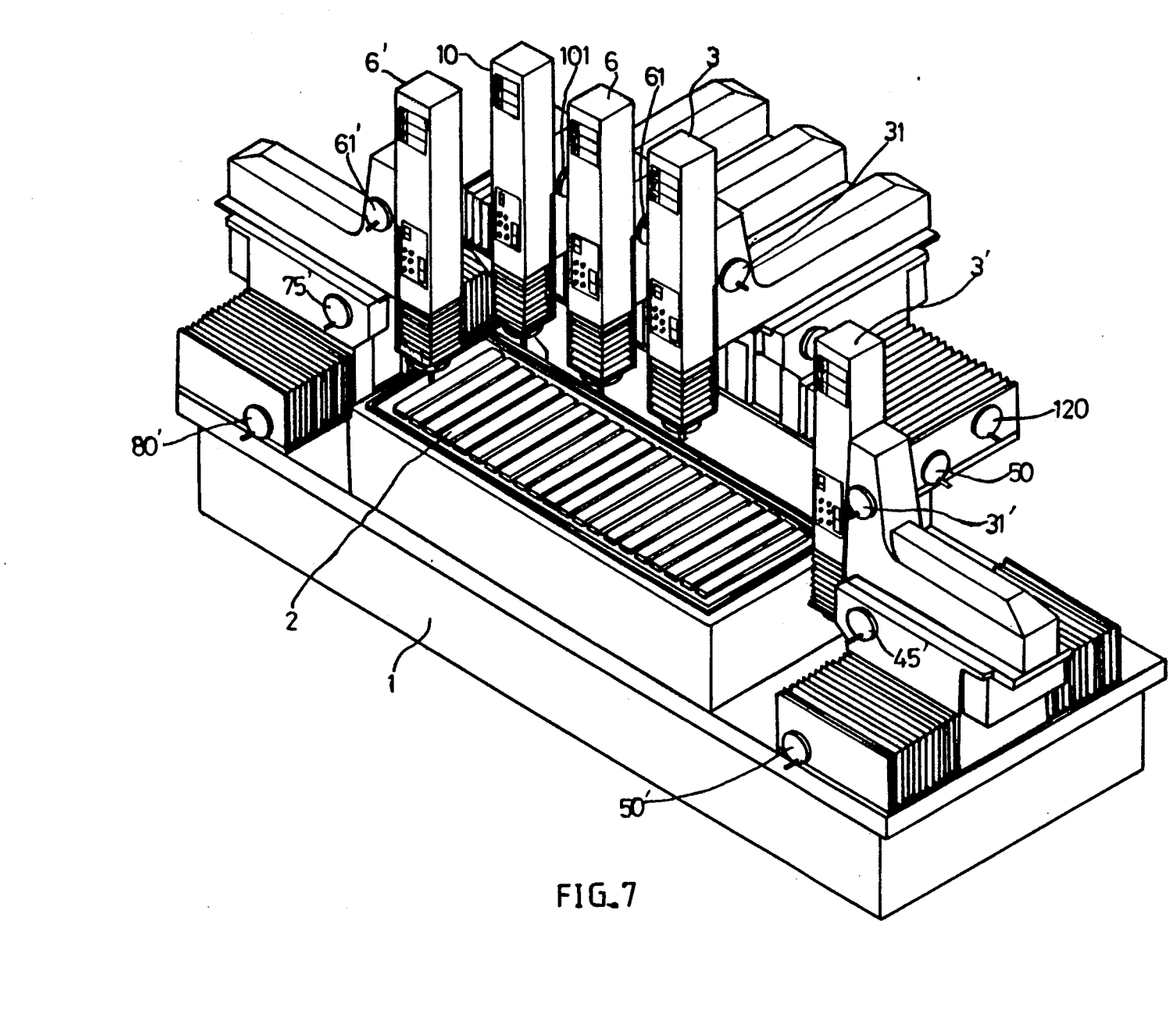
FIG. 7 is a perspective view of a further embodiment of the present invention.

FIG. 7 illustrates still another embodiment of the present invention, in which three head members are installed on the rear side of the supporting frame 1, and two head members 3' and 6' are installed on both ends of the supporting frame 1 respectively (or each end may be installed with two, or three, or more than three head members, if necessary). The X-axis transmission assemblies of the head members 3' and 6' are installed at a level that is slightly lower than the top surface of the working rack 2 in order that the two head members 3' and 6' might be moved to the rear side of the supporting frame 1, when not in use, beside the three head members without affecting the normal operation of the three head members. Since the X-axis transmission assemblies of the head members 3' and 6' are on a lower level than the working rack 2, the two head members would not bother any large working piece placed on the working rack; therefore, the present invention is deemed a device which can process work in a multiple manner so as to save time, manpower, space and costs.

I claim:

1. An electro-discharge machining apparatus, comprising a frame (1); a work support means (2) on said frame; first and second parallel horizontal guide rails (11 and 12) offset from each other on said frame alongside the work support means, said rails defining an X axis adjustment direction for the apparatus; a first base (40) slidably mounted on said first guide rail for adjustment along the X axis; a second base (70) slidably mounted on said second guide rail for adjustment along the X axis; a separate horizontal screw means arranged between the frame and each base, each said screw means being offset from the other whereby each base can be independently adjusted along its associated guide rail; a sliding block (32 or 62) motion along a Y axis transverse to the associated rail, a second separate horizontal screw means carried by each base for independent adjustment of the associated sliding block along the Y axis; a separate electrode support head (3 or 6) slidably mounted on each sliding block for linear vertical motion along a Z axis normal to the associated Y axis; and a third separate vertical screw means (33 or 63) carried by each sliding block for independent adjustment of the associated electrode support head along the Z axis.

2. The apparatus of claim 1, and further comprising a third horizontal guide rail on said frame, said third guide rail extending at right angles to the first and second rails below the plane of the work support means surface; a third base slidably mounted on said third rail for adjustment therealong; a third sliding block slidably mounted on said third base for horizontal adjustment in a direction normal to the third rails; and a third electrode support head (3') slidably mounted on said third sliding block for vertical linear motion along a Z axis normal to the adjustment path of said third sliding block; said third base being located below the plane of the work support means surface so that a workpiece thereon can overhang said third base.

* * * * *